US010171011B2

(12) United States Patent
Takano et al.

(10) Patent No.: US 10,171,011 B2
(45) Date of Patent: Jan. 1, 2019

(54) ELECTRIC TOOL

(71) Applicant: HITACHI KOKI CO., LTD., Tokyo (JP)

(72) Inventors: Nobuhiro Takano, Ibaraki (JP); Kazutaka Iwata, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 278 days.

(21) Appl. No.: 14/786,212

(22) PCT Filed: Apr. 25, 2014

(86) PCT No.: PCT/JP2014/062212
§ 371 (c)(1),
(2) Date: Oct. 22, 2015

(87) PCT Pub. No.: WO2014/175470
PCT Pub. Date: Oct. 30, 2014

(65) Prior Publication Data
US 2016/0079887 A1 Mar. 17, 2016

(30) Foreign Application Priority Data
Apr. 26, 2013 (JP) .................................. 2013-093878

(51) Int. Cl.
*H02P 1/04* (2006.01)
*H02P 1/02* (2006.01)
(Continued)

(52) U.S. Cl.
CPC .............. *H02P 1/028* (2013.01); *B25B 21/00* (2013.01); *B25B 21/02* (2013.01); *H02P 1/22* (2013.01)

(58) Field of Classification Search
CPC . H02P 1/028; H02P 1/22; B25B 21/00; B25B 21/02; B25F 5/008
(Continued)

(56) References Cited

U.S. PATENT DOCUMENTS 5,831,402 A 11/1998 Yang
2003/0089511 A1* 5/2003 Tsuneda .................. B25B 21/00
173/217

(Continued)

FOREIGN PATENT DOCUMENTS

EP 1 510 299 A2 3/2005
GB 2 437 656 A 10/2007
(Continued)

OTHER PUBLICATIONS

Japanese Office Action for the related Japanese Patent Application No. 2013-093878 dated Sep. 6, 2016.
(Continued)

*Primary Examiner* — Eduardo Colon Santana
*Assistant Examiner* — Gabriel Agared
(74) *Attorney, Agent, or Firm* — Kenealy Vaidya LLP

(57) ABSTRACT

An electric tool includes: a motor configured to be driven by PWM controlling a semiconductor switching element; a trigger configured to adjust startup and rotation of the motor; a changeover switch configured to switch a rotation direction of the motor between a forward rotation and a reverse rotation; a power transmission mechanism configured to rotate a tip tool by the motor, and a controller configured to control rotation of the motor. When the reverse rotation is set by the changeover switch, the controller PWM controls the semiconductor switching element at a high duty ratio after the trigger is pulled to drive the motor, and thereafter drives the motor at a state where the high duty ratio is changed to a low duty ratio.

11 Claims, 12 Drawing Sheets

(51) Int. Cl.
*B25B 21/00* (2006.01)
*B25B 21/02* (2006.01)
*H02P 1/22* (2006.01)

(58) Field of Classification Search
USPC .......................................................... 318/431
See application file for complete search history.

(56) References Cited

U.S. PATENT DOCUMENTS

| | | | |
|---|---|---|---|
| 2005/0045354 A1 | 3/2005 | Arimura et al. | |
| 2007/0251359 A1 | 11/2007 | Junkers et al. | |
| 2009/0295313 A1* | 12/2009 | Suzuki | B25F 5/00 318/139 |
| 2010/0308764 A1* | 12/2010 | Suzuki | B25F 5/00 318/494 |
| 2011/0180286 A1* | 7/2011 | Oomori | B25F 5/008 173/20 |
| 2013/0008679 A1 | 1/2013 | Nishikawa et al. | |
| 2013/0193881 A1* | 8/2013 | Muto | B25F 5/00 318/139 |

FOREIGN PATENT DOCUMENTS

| | | |
|---|---|---|
| JP | 5-104454 A | 4/1993 |
| JP | 7-314342 A | 12/1995 |
| JP | 2008-278633 A | 11/2008 |
| JP | 2009-285805 A | 12/2009 |
| JP | 2011-212800 A | 10/2011 |
| WO | 2011/122361 A1 | 10/2011 |

OTHER PUBLICATIONS

International Search Report and Written Opinion of the International Search Report for PCT/JP2014/062212 dated Jul. 17, 2014.

* cited by examiner

ELECTRIC TOOL

This application is a U.S. national phase filing under 35 U.S.C. § 371 of PCT Application No. PCT/JP2014/062212, filed Apr. 25, 2014, and which in turn claims priority under 35 U.S.C. § 119 to Japanese Patent Application No. JP2013-093878, filed Apr. 26, 2013, the entireties of which are incorporated by reference herein.

TECHNICAL FIELD

The invention relates to an electric tool, and more particularly to, an electric tool having improved a control method of a motor to be used as a driving source.

BACKGROUND ART

Regarding a hand-held electric tool, a cordless impact tool that is driven by the electric energy accumulated in a battery is widely used. In the impact tool where a tip tool such as a drill or a driver is rotationally driven by a motor to thus perform a required operation, the battery is used to drive a brushless DC motor, as disclosed in JP-A-2008-278633, for example. The brushless DC motor refers to a DC (direct current) motor that has no brush (brush for rectification). The brushless DC motor employs a coil (winding) at a rotor-side and a permanent magnet at a stator-side and has a configuration where power driven by an inverter is sequentially energized to a predetermined coil to thus rotate the rotor. The brushless DC motor has higher efficiency than a motor having a brush and can obtain a high output while using a rechargeable secondary battery. Since the brushless DC motor includes a circuit on which a switching element for rotationally driving the motor is mounted, it is easy to achieve an advanced rotation control of the motor by an electronic control.

The brushless DC motor includes a rotor having a permanent magnet and a stator having multiple-phase armature windings (stator windings) such as three-phase windings. The brushless DC motor is mounted with a position detecting element configured by a plurality of Hall ICs that detects a position of the rotor by detecting a magnetic force of the permanent magnet of the rotor and an inverter circuit that drives the rotor by switching a direct current voltage supplied from a battery pack and the like with semiconductor switching elements such as FET (Field Effect Transistor) or IGBT (Insulated Gate Bipolar Transistor) and changing energization to the stator winding of each phase. The inverter circuit is controlled by a microcomputer and sets energization timing of the armature winding of each phase on the basis of position detection results of the rotor by the position detecting elements such as Hall ICs.

SUMMARY

By the way, in recent years, the output of the electric tool has been increased and it is thus possible to obtain a high rotational speed and high fastening torque while reducing a size of the tool as the brushless DC motor is used. However, realizing the high fastening torque causes striking stronger beyond necessity to be applied in a screw fastening operation or the like. Therefore, it is important to select a motor having appropriate output and characteristic in conformity to the necessary fastening torque. In particular, when the output of the motor is more increased than necessary in the impact tool, a possibility that a head of the screw will be damaged becomes higher and a lifespan or temperature increase upon continuous operation is limited. From these standpoints, it may be considered to limit the output of the motor. For this reason, the electric tool may not maximize the potential that is obtained by the motor.

The invention has been made in light of the above situations, and an object of the invention is to provide an electric tool capable of completing a fastening operation at high speed while limiting a continuous driving output by using a motor having an output as high as possible.

Another object of the invention is to provide an electric tool having a high motor output and high durability capable of preventing breakage of a screw head or bolt upon striking.

Yet another object of the invention is to provide an electric tool capable of suppressing a temperature increase of a motor to thus rapidly complete a fastening operation with appropriate torque by controlling the motor, which has a sufficiently high output as regards a fastening target, to lower an upper limit of a duty ratio just after seating is made.

Representative features of the invention to be disclosed in the specification are as follows.

By this configuration, it is possible to effectively protect the electric tool from the temperature increase or mechanical stress, which is caused as the high-output motor is continuously driven. Thus, it is possible to implement the electric tool having the high reliability and long lifespan. The higher output, higher rotation number motor than the motor of the related art is positively used, so that it is possible to perform the operation at high output and high speed even when performing the operation of unfastening the screw or bolt by the reverse rotation.

By this configuration, it is possible to generate the maximum torque at an early stage of the screw or bolt unfastening operation, so that it is possible to prevent the screw or bolt from being not moved due to the torque deficiency. When the current value is below the threshold $I_5$, the motor is again driven at the high duty ratio. Therefore, it is possible to release a light-load, so-called free run state at high speed, shortening the operation time. In this way, even upon the reverse rotation, the motor is rotated while decreasing the duty ratio. Therefore, compared to the related art where the motor having only an output, which does not thermal and mechanical problems even though the motor is continuously driven at the duty ratio of 100%, is used, it is possible to adopt a higher-output motor by 10% or larger in the electric tool.

The switching timing may be variously set by a method of seeing a current value, a method of setting the timing with a time interval, a method of determining the timing by a reaction force applied from the output shaft, and the like. However, when the low duty ratio and the high duty ratio are set every time interval T2, it is possible to implement the switching timing without adding a new detector or control device.

By this configuration, it is possible to prevent a situation where the screw or bolt fastened by the electric tool cannot be unfastened due to the fastening torque deficiency upon the reverse rotation.

The controller drives the motor at a state where the duty ratio is changed from the high value to the low value, when the predetermined time T1 elapses after the trigger is pulled to rotate the motor in the reverse direction. Therefore, it is possible to effectively protect the electric tool from the temperature increase or mechanical stress, which is caused as the high-output motor is continuously driven.

By this configuration, it is possible to effectively protect the electric tool from the temperature increase or mechanical stress, which is caused as the high-output motor is continuously driven. Therefore, it is possible to implement the electric tool having the high reliability and long lifespan. The control of lowering the rotation number by switching the mode may be executed by making an advance of the motor small, switching an energization angle of the motor or switching a coil of the motor.

The switching may be controlled so that the duty ratio is changed from the high value to the low value or the rotating property of the motor is switched from the high-speed mode just after the starting of the reverse rotation to the low-speed mode, when the predetermined time T1 elapses from the pulling of the trigger.

According to the invention, it is possible to provide the electric tool capable of securely unfastening the screw or bolt at high output and shortening the unfastening time. It is possible to provide the electric tool having excellent operability.

The foregoing and other objects and novel features of the invention will be apparent from the below descriptions and accompanying drawings.

BRIEF DESCRIPTION OF DRAWINGS

FIGS. 6A and 6B illustrate a setting method of the duty ratio at each operation mode of the impact tool, in which FIG. 6A shows a setting method of the related art and FIG. 6B shows the setting method of this exemplary embodiment.

DESCRIPTION OF EMBODIMENTS

First Exemplary Embodiment

Figure 1:
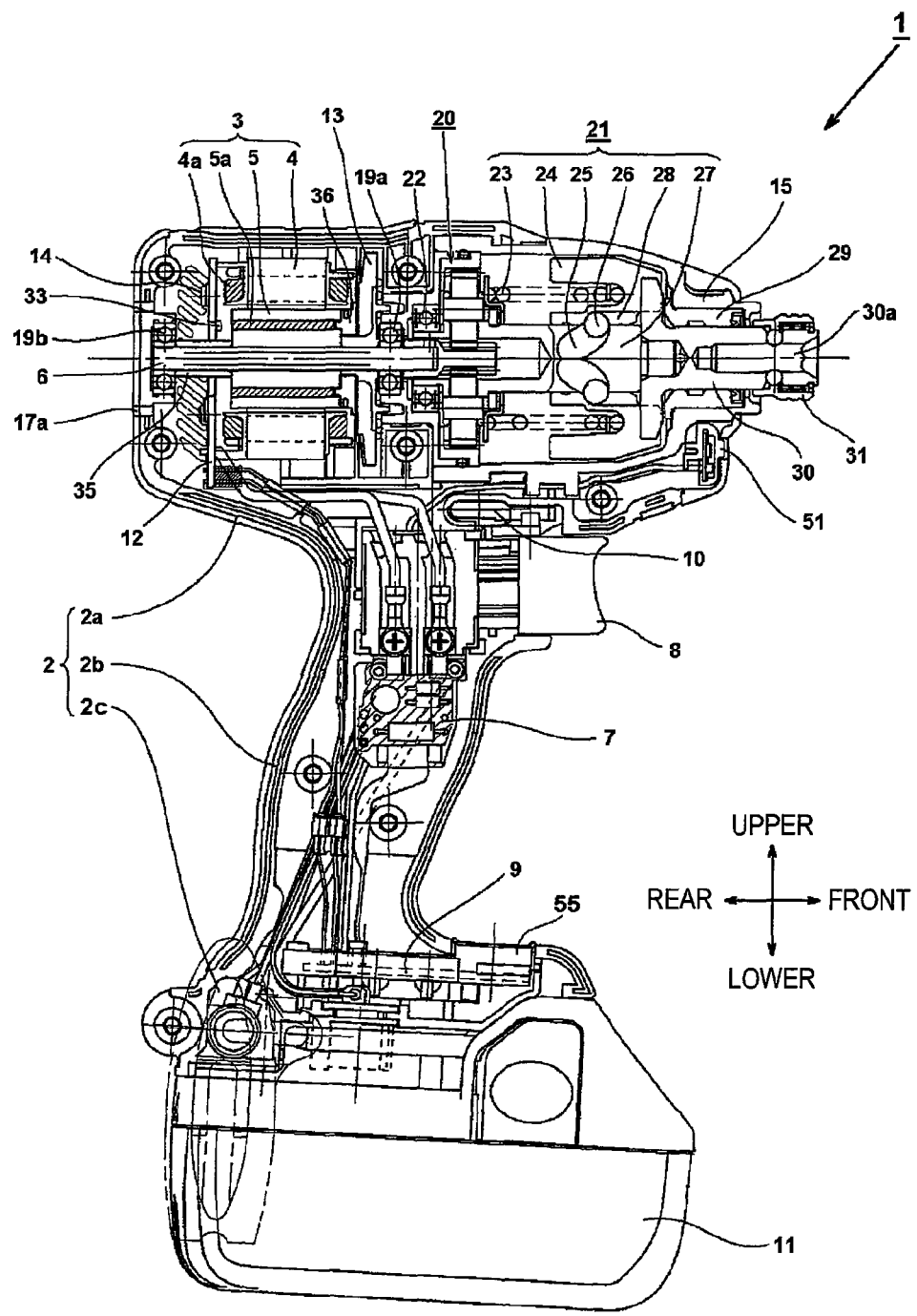
FIG. 1 is a sectional view showing an internal structure of an impact tool 1 according to an exemplary embodiment of the invention.

Hereinafter, exemplary embodiments of the invention will be described with reference to the drawings. In the following descriptions, an upper-lower direction and a front-rear direction are referred to the directions shown in the drawings. FIG. 1 is a sectional view showing an internal structure of an electric tool according to an exemplary embodiment of the invention. In this exemplary embodiment, an impact tool 1 is exemplified as the electric tool.

The impact tool 1 uses a rechargeable battery 9 as a power supply and uses a motor 3 as a driving source. The impact tool 1 drives an impact mechanism 21 while decelerating the same with a predetermined speed reduction ratio by a deceleration mechanism 20, thereby applying a rotational force and a striking force to an anvil 30 that is an output shaft. Thereby, the impact tool 1 intermittently transmits the rotational striking force to a tip tool (not shown) such as a driver bit, which is mounted in a mounting hole 30a and is held by a mounting mechanism 31, thereby fastening a screw or bolt.

The motor 3 is a brushless DC motor, includes a rotor 5 having two sets of magnets 5 arranged on an inner periphery of the motor and a stator 4 having windings 4a wound in six slots on an outer periphery thereof and is a so-called four-pole, six-slot motor. In the meantime, the invention is not limited to the four-pole, six-slot motor and may adopt a motor having other poles and slots. The motor 3 is accommodated in a cylindrical body part 2a of a housing 2 having a substantial T-shape, when seen from the side. A rotary shaft 6 of the motor 3 is rotatably held by a bearing 19a, which is provided near a center of the body part 2a of the housing 2, and a bearing 19b that is provided at a rear end-side thereof. A rotor fan 13 that is coaxially mounted with the rotary shaft 6 and is rotated in synchronous with the motor 3 is provided in front of the motor 3. An inverter circuit board 12 for driving the motor 3 is arranged in the rear of the motor 3.

Air flow that is generated by the rotor fan 13 is introduced into the body part 2a through an air inlet 17a and a slit (a slit 17b in FIG. 2) (which will be described later) formed on a portion of the housing around the inverter circuit board 12, mainly flows to pass through between the rotor 5 and the stator 4, is sucked from the rear of the rotor fan 13 and flows in a diametrically outer direction of the rotor fan 13. Then, the air flow is discharged to the outside of the housing 2 through a slit (a slit 18 in FIG. 8) (which will be described later) formed on a portion of the housing around the rotor fan 13. The inverter circuit board 12 is a double-sided board having the substantially same circular shape as an outer shape of the motor 3. A plurality of switching elements 14 such as FETs (Field Effect Transistors) and position detection elements 33 such as Hall ICs are mounted on the inverter circuit board.

A sleeve 36 and the rotor fan 13 are mounted coaxially with the rotary shaft 6 between the rotor 5 and the bearing 19a. The rotor 5 forms a magnetic path formed by the magnets 5a. The sleeve 36 may be made of plastic or metal, for example. When the sleeve 36 is made of metal, the sleeve is preferably made of a non-magnetic material so as not to influence the magnetic path of the rotor 5.

The rotor fan 13 is integrally formed by plastic molding, for example. The rotor fan is a so-called centrifugal fan that sucks the air from an inner peripheral side at the rear and discharges the air radially outwardly at the front side. A plastic spacer 35 is provided between the rotor 5 and the bearing 19b. The spacer 35 has a substantially cylindrical shape and sets a gap between the bearing 19b and the rotor 5. The gap is required to coaxially arrange the inverter circuit board 12 and to form a space that is necessary as a flow path of the air flow to cool the switching elements 14.

A trigger 8 is arranged on an upper part of a handle part 2b that extends substantially at a right angle from and integrally with the body part 2a of the housing 2. A switch circuit board 7 is provided below the trigger 8. A control circuit board 9 that has a function to control the speed of the motor 3 by an operation of pulling the trigger 8 is accommodated in a lower part of the handle part 2b. The control circuit board 9 is electrically connected to the battery 11 and the switch circuit board 7. The control circuit board 9 is connected to the inverter circuit board 12 through a signal line. The battery 11 including a nickel-cadmium battery, a lithium-ion battery or the like is detachably mounted below the handle part 2b.

The impact mechanism 21 that is provided at an output-side of the planetary gear deceleration mechanism 20 includes a spindle 27 and a hammer 24. A rear end of the impact mechanism is rotatably held by a bearing 22 and a front end thereof is rotatably held by a metal member 29. When the trigger 8 is pulled and thus the motor 3 is enabled to start, the motor 3 starts to rotate in a direction set by a forward/reverse switching lever 10. The rotational force of the motor is decelerated by the deceleration mechanism 20 and transmitted to the spindle 27, so that the spindle 27 is rotationally driven at a predetermined speed. Here, the spindle 27 and the hammer 24 are connected to each other by a cam mechanism. The cam mechanism includes a V-shaped spindle cam recess 25 formed on an outer peripheral surface of the spindle 27, a hammer cam recess 28 formed on an inner peripheral surface of the hammer 24 and balls 26 that are engaged with the cam recesses 25, 28. The hammer 24 is all the time urged forward by a spring 23. When stationary, the hammer 24 is located at a position spaced from an end surface of the anvil 30 by engagement of the balls 26 and the spindle cam recesses 25, 28. Convex portions (not shown) are symmetrically formed at two locations on rotation planes of the hammer 24 and the anvil 30, which are opposed to each other.

When the spindle 27 is rotationally driven, the rotation of the spindle is transmitted to the hammer 24 through the cam mechanism. At this time, the convex portion of the hammer 24 is engaged with the convex portion of the anvil 30 while the hammer 24 does not make a half turn, so that the anvil 30 is rotated. However, when relative rotation is generated between the spindle 27 and the hammer 24 due to an engagement reaction force at that time, the hammer 24 starts to retreat towards the motor 3 while compressing the spring 23 along the spindle cam recess 25 of the cam mechanism. When the convex portion of the hammer 24 gets beyond the convex portion of the anvil 30 by the retreating movement of the hammer 24 and the engagement between these convex portions is thus released, the hammer 24 is rapidly accelerated in the rotation direction and in the forward direction by the action of the cam mechanism and the elastic energy accumulated in the spring 23, in addition to the rotational force of the spindle 27. Further, the hammer 24 is moved forward by the urging force of the spring 23 and the convex portion of the hammer 24 is again engaged with the convex portion of the anvil 30, so that the hammer starts to rotate integrally with the anvil. At this time, since a powerful rotational striking force is applied to the anvil 30, the rotational striking force is transmitted to a screw through the tip tool (not shown) mounted in the mounting hole 30a of the anvil 30. Thereafter, the same operation is repeatedly performed and thus the rotational striking force is intermittently and repeatedly transmitted from the tip tool to the screw, so that the screw can be screwed into a member to be fastened (not shown) such as wood, for example.

Figure 2:
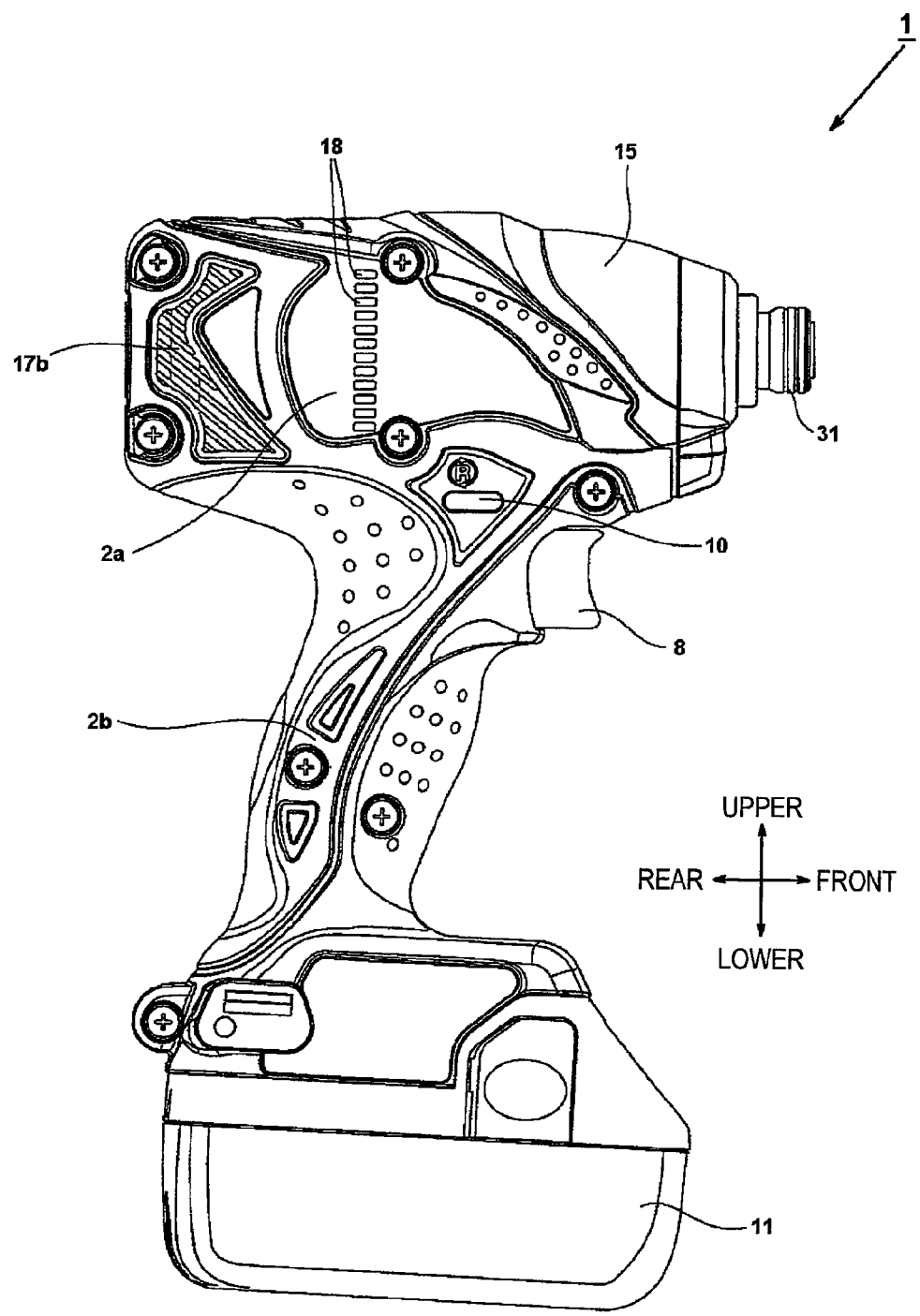
FIG. 2 is a side view showing an outward appearance of the impact tool 1 according to the exemplary embodiment of the invention.
Figure 3:
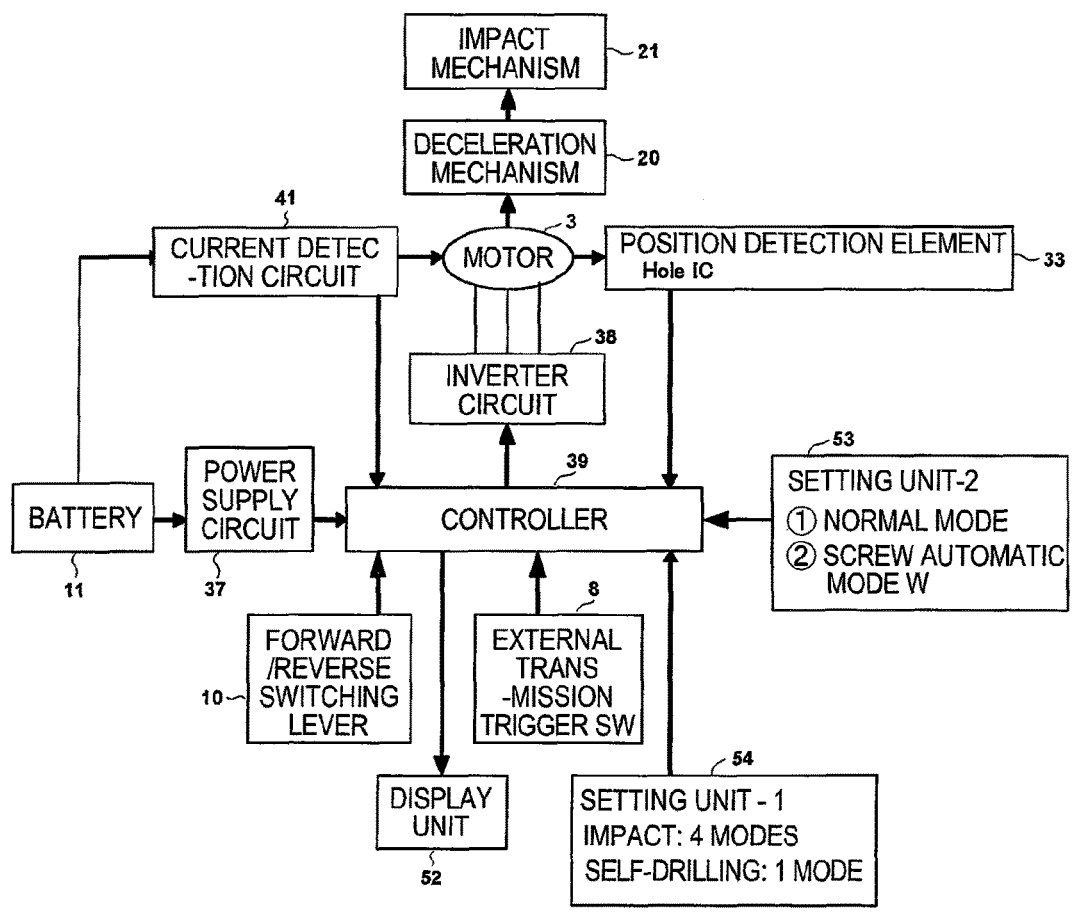
FIG. 3 is a schematic block diagram of the impact tool 1 according to the exemplary embodiment of the invention.

FIG. 2 is a side view showing an outward appearance of the impact tool 1 according to the exemplary embodiment of the invention. In FIG. 2, the slit 17b for air suction is formed on an outer periphery-side of the inverter circuit board 12 of the body part 2a of the housing 2 and the slits 18 are formed on an outer periphery portion of the rotor fan 13. A hammer case 15 that is made of metal and has a cup shape is provided at a front-side of the housing 2. The hammer case 15 accommodates therein the deceleration mechanism 20 and the impact mechanism 21 and is formed with a hole at a front portion corresponding to a bottom part of the cup through which the anvil 30 passes. A mounting mechanism 31 is provided on an outer side of the hammer case 15. FIG. 3 is a schematic block diagram of the impact tool 1 according to the exemplary embodiment of the invention. In this exemplary embodiment, the battery 11 including a secondary battery is used as the power supply and the brushless DC motor is used as the motor 3 that is a driving source. In order to control the brushless DC motor, a controller 39 is used to drive an inverter circuit 38 including a plurality of semiconductor switching elements. The controller 39 is driven by a low voltage that is generated by a power supply circuit 37 using the power of the battery 11. Three power lines are connected to the motor 3 from the inverter circuit 38. Driving current is supplied to a predetermined phase by the inverter circuit 38, so that the motor 3 is rotated. The output of the motor 3 is transmitted to the deceleration mechanism 20 and the impact mechanism 21 is driven by the rotational force decelerated by the deceleration mechanism 20. In order to drive the motor 3 by the controller 39, the position detection elements (the Hall ICs) 33 that generate signals for position detection of the rotor 5 are provided near the motor 3, and outputs of the position detection element 33 are input to the controller 39. A signal of the forward/reverse switching lever 10 and a signal of the trigger 8 are input to the controller 39. A first setting unit 54 and a second setting unit 53 are provided as a motor driver for driving the motor 3. In the first setting unit 54, it is possible to set four operation modes in which the rotation number of the motor is set as an impact mode and fastening torque is divided into four stages. It is possible to set one self-drilling screw mode for fastening a self-drilling screw. In the second setting unit 53, it is possible to set a normal mode and a screw mode. The first setting unit 54 and the second setting unit 53 may be provided on an operation panel 55 (refer to FIG. 1), for example.

Figure 4:
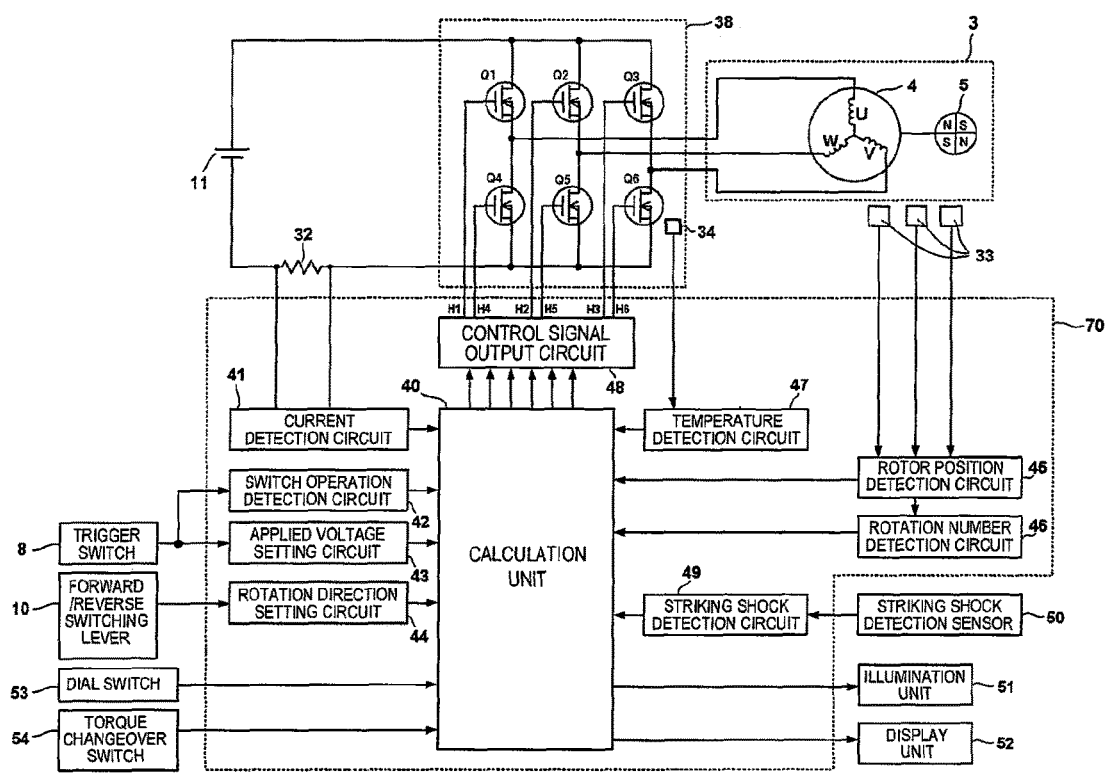
FIG. 4 is a block diagram showing a circuit configuration of a drive control system of a motor 3 in the impact tool according to the exemplary embodiment of the invention.

Subsequently, a configuration and an operation of a drive control system of the motor 3 are described with reference to FIG. 4. FIG. 4 is a block diagram showing a configuration of the drive control system of the motor. In this exemplary embodiment, the motor 3 includes a three-phase brushless DC motor. The motor 3 is a so-called inner rotor type and includes the rotor 5 that is configured by embedding the magnets 5a (permanent magnets) having a pair of N-pole and S-pole, the three position detection elements 33 that are arranged at an angle of 60° to detect the rotation position of the rotor 5 and the stator 4 that is composed of star-connected three-phase windings U, V, W, which are controlled at a current energization interval of an 120° electrical angle on the basis of position detection signals from the position detection elements 33.

The inverter circuit 38 that is mounted on the inverter circuit board 12 is configured by six FETs (hereinafter, simply referred to as "transistor") Q1 to Q6, which are connected in a three-phase bridge form, and a flywheel diode (not shown). A temperature detection element (thermistor) 34 is fixed at a position close to the transistor on the inverter circuit board 12. Each gate of the six bridge-connected transistors Q1 to Q6 is connected to a control signal output circuit 48. A source or drain of the six transistors Q1 to Q6 is connected to the star-connected armature windings U, V, W. Thereby, the six transistors Q1 to Q6 perform a switching operation by a switching element driving signal that is output from the control signal output circuit 48, and supply power to the armature windings U, V, W by using the DC voltage of the battery 11 applied to the inverter circuit as the three-phase (U phase, V phase, W phase) AC voltages Vu, Vv, Vw.

An calculation unit 40, a current detection circuit 41, a switch operation detection circuit 42, an applied voltage setting circuit 43, a rotation direction setting circuit 44, a rotor position detection circuit 45, a rotation number detection circuit 46, a temperature detection circuit 47, the control signal output circuit 48 and a striking shock detection circuit 49 are mounted on the control circuit board 9. Although not shown, the calculation unit 40 includes a CPU for outputting a driving signal based on a processing program and data, a ROM for storing a program corresponding to a flowchart (which will be described later) or control data, a RAM for temporarily storing data and a microcomputer having a timer and the like embedded therein. The current detection circuit 41 is a current detector for detecting current flowing through the motor 3 by measuring a voltage across a shunt resistance 32, and the detected current is input to the calculation unit 40. In this exemplary embodiment, the shunt resistance 32 is provided between the battery 11 and the inverter circuit 38 to thus detect the current value flowing through the semiconductor switching element. Alternatively, the shunt resistance may be provided between the inverter circuit 38 and the motor 3 to thus detect the current value flowing through the motor 3.

The switch operation detection circuit 42 detects whether the trigger 8 is pulled or not and outputs an on signal to the calculation unit 40 when the trigger 8 is pulled even slightly. The applied voltage setting circuit 43 is a circuit for setting a voltage to be applied to the motor 3, that is, a duty ratio of a PWM signal, in response to a moving stroke of the trigger 6. The rotation direction setting circuit 44 is a circuit for setting the rotation direction of the motor 3 by detecting a forward rotation or reverse rotation operation using the forward/reverse switching lever 10 of the motor. The rotor position detection circuit 45 is a circuit for detecting a positional relation between the rotor 5 and the armature windings U, V, W of the stator 4, based on the output signals of the three position detection elements 33. The rotation number detection circuit 46 is a circuit for detecting the rotation number of the motor based on the number of the detection signals from the rotor position detection circuit 45, which is counted in unit time. The control signal output circuit 48 supplies a PWM signal to the transistors Q1 to Q6, based on the output from the calculation unit 40. The power supplied to each of the armature windings U, V, W is adjusted by controlling a pulse width of the PWM signal and the rotation number of the motor 3 in the set rotation direction can be thus controlled. The striking shock detection circuit 49 detects a time at which a striking is made by the impact mechanism 21 or a magnitude of the torque thereof, based on a detection signal from a striking shock detection sensor 50. In the meantime, a gyro sensor (not shown) or other arbitrary sensor may be provided, instead of the striking shock detection sensor 50 or in addition to the striking shock detection sensor 50.

An output signal of a dial switch 53 for switching an operation mode and an output signal of a toque changeover switch 54 for setting a torque value (or the rotation number of the motor) are input to the calculation unit 40. The calculation unit 40 further controls lighting of an illumination unit 51 such as an LED for illuminating the vicinity of the tip tool. The lighting may be controlled by determining whether a lighting switch (not shown) is pressed or not by the calculation unit 40 or may be made in conjunction with a pulled operation of the trigger 8. A display unit 52 is to display an intensity of a setting torque value, a remaining amount of the battery and the other information and displays the information by an optical unit. In this exemplary embodiment, a plurality of LEDs, an LED indicator capable of displaying a number and an alphabet by seven or more segments, a liquid crystal indicator and the like may be used.

Figure 5:
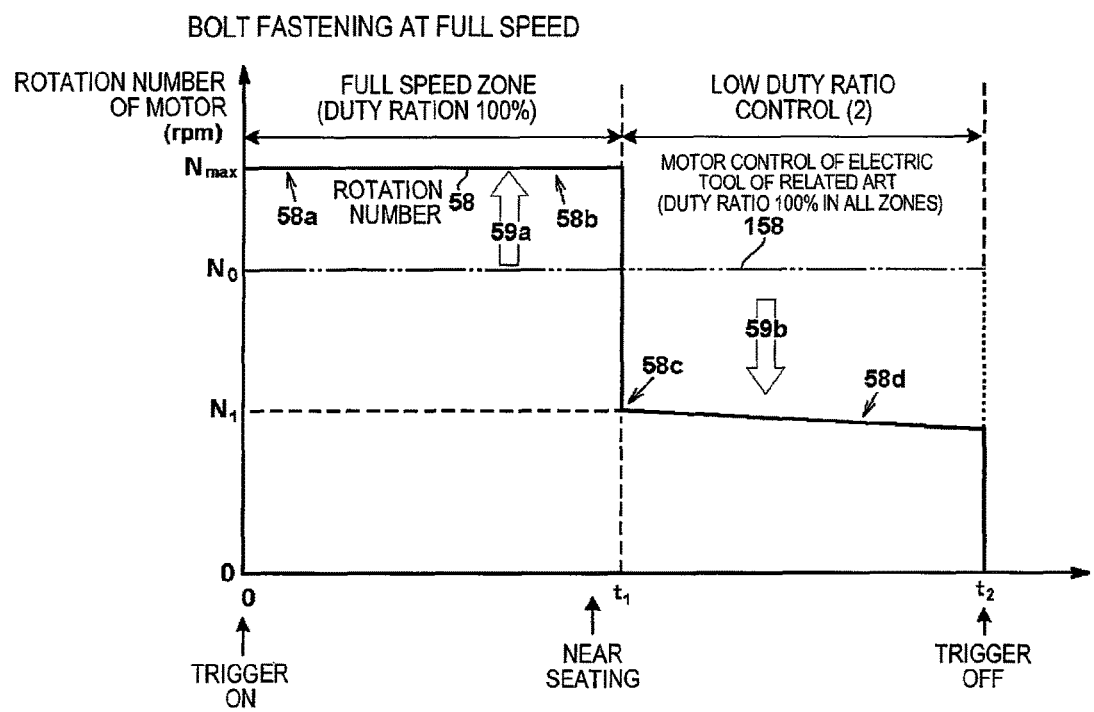
FIG. 5 shows a control method of a duty ratio of the impact tool 1 according to the exemplary embodiment of the invention, showing a relation between a rotation number 58 of the motor and the duty ratio.

Next, a method of controlling a duty ratio of the impact tool 1 according to the exemplary embodiment is described with reference to FIG. 5. In an impact driver using a brushless DC motor of the related art, after an operator turns on (pulls) the trigger 8 at time $t_0$ and the motor 3 starts to rotate, an upper limit of a duty ratio (a setting value of the duty ratio when the trigger is pulled to the highest degree) is controlled to be 100% in all zones and the rotation number 158 of the motor is constant as shown with a dashed-two dotted line (although the rotation number may be actually varied due to a change in the load, it is not considered here). At time $t_2$, when the operator turns off (releases) the trigger, the rotation of the motor 3 stops.

In contrast, in this exemplary embodiment, the upper limit of the duty ratio is controlled to be 100% from the operator pulls the trigger 8 until the motor 3 starts to rotate at time $t_0$ so that the motor 3 is driven at full speed. Then, after it is determined that the impact operation is performed one or more times and a screw or bolt, which is a fastening target, is seated, the duty ratio is drastically lowered at time $t_1$, so that the motor is controlled by the low duty ratio. By this control, the rotation number of the motor 3 becomes Nmax and is controlled to be substantially constant from a zone 58a to a zone 58b indicated by arrows. After that, as shown with an arrow 58c, the rotation number 58 of the motor 3 is sharply lowered and is controlled, as shown with the arrow 58c, and the motor 3 is rotated at low speed until the operator releases the trigger 8. The rotation number of the motor 3 is gradually lowered as the load is increased, from the arrow 58c to an arrow 58d.

In this exemplary embodiment, the battery 11 having the same voltage and the same capacity as that of the related art is used. However, the output of the motor 3 is higher than that of the related art. For example, regarding the motor of the related art, a size and a core part of the stator 4 and the rotor 5 are the same as regards the shape, whereas the winding number of the winding 4a is decreased, a line diameter of the winding 4a is increased to supply the larger current to the winding 4a and the rotation number of the motor 3 is increased to increase the output. In the meantime, if the motor control is performed in the way of the related art (the continuous driving is made at the duty ratio of 100% until the trigger is released) at a state where the output is increased, it is not preferable because the temperature is excessively increased and a serious situation is thus made as regards the heat and the load is increased in the motor 3 and the mechanism part such as the impact mechanism 21 if the trigger-off timing of the operator is delayed after the seating. According to the exemplary embodiment, the motor 3 is driven at the full speed (high speed) until the time $t_1$ at which it is determined that the striking is made several times and the seating is made, thereby, as compared to the method of the related art, the rotation number is increased in the zone in which the load is light, as shown with the arrow 59a. After time $t_1$, the rotation number is drastically lowered in the zone in which the striking is repeated, as shown with the arrow 59b, so that the load is reduced in the motor 3 or mechanism part. By this control, it is possible to complete the fastening in a short time by using the high-output motor and to improve the durability of the motor or mechanism part even if the high-power motor 3 is adopted.

Figure 6A:
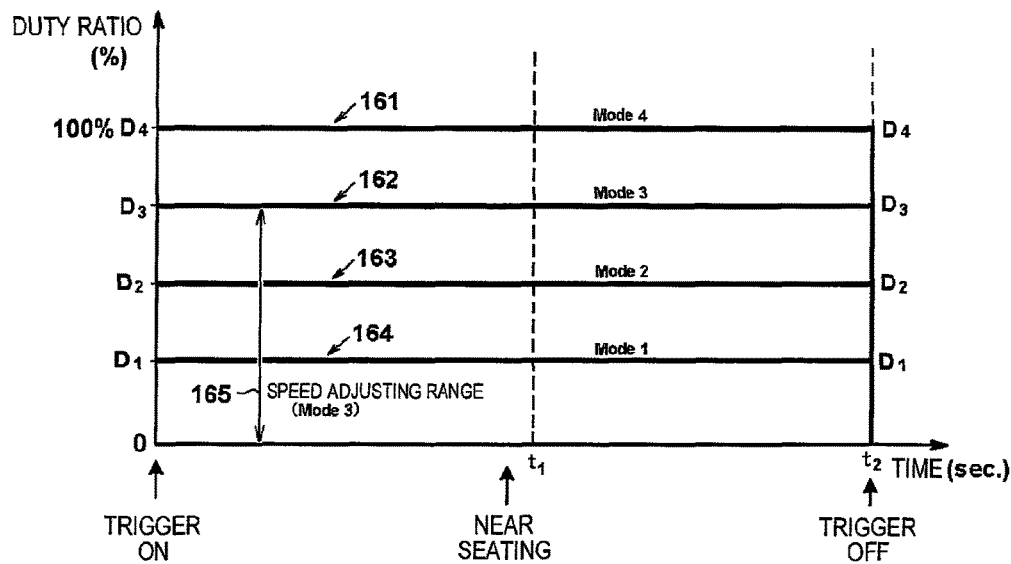
Figure 6B:
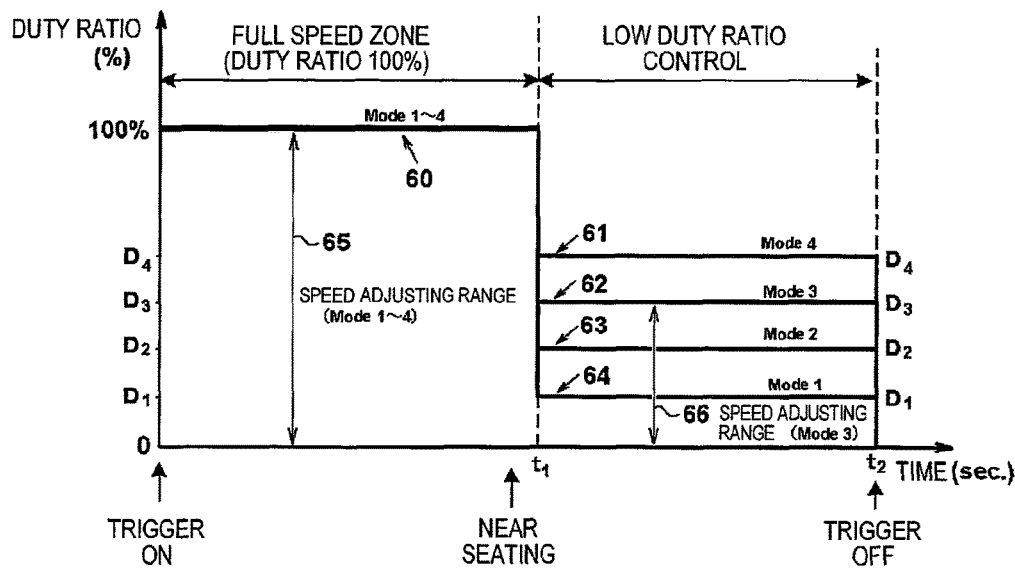

FIGS. 6A and 6B illustrates a setting method of the duty ratio in the impact mode, in which FIG. 6A shows a setting method of the related art and FIG. 6B shows the setting method of this exemplary embodiment. In FIGS. 6A and 6B, a vertical axis indicates the upper limit of the duty ratio and a horizontal axis indicates time. The impact tool 1 that is premised in this exemplary embodiment has four modes of a mode 1 to a mode 4, as the impact operation. The modes are switched whenever the toque changeover switch 54 provided on the operation panel 55 is pressed. When the modes are switched, the rotation number of the motor 3 is switched. For example, in the mode 1 (about 1) where the fastening torque is lowest, the rotation number of the motor 3 is 900 revolutions/minute at a state where the trigger 8 is pulled to the highest degree, in the mode 2 (about 2), the rotation number of the motor 3 is 1,500 revolutions/minute, in the mode 3 (middle), the rotation number of the motor 3 is 2,200 revolutions/minute and in the mode 4 (strong) where the fastening torque is highest, the rotation number of the motor 3 is 2,900 revolutions/minute. In order to set the rotation number of the motor 3 in this way, the controller sets the duty ratios $D_1$ to $D_4$, as shown with arrows 161 to 164. Here, the duty ratio $D_4$ is 100%. The duty ratios (maximum value) $D_1$ to $D_4$ are constant. For example, in the mode 3, the duty ratio is set within a range of 0 to $D_3$, depending on a pulling amount of the trigger 8, as shown with an arrow 165. Here, when the motor 3 is rotated at a state where the operator pulls the trigger 8 to the highest degree, the constant control of the same duty ratio is performed near a position at which the seating is made, even after time $t_1$. In order to perform the control, according to the impact tool of the related art, the rated motor 3 is selected which does not cause the thermal or mechanical strength problem even when the motor 3 is continuously driven at the duty ratio of 100%, as shown with the arrow 161.

In this exemplary embodiment, as shown in FIG. 6B, the duty ratio is set to be 100% in any of the modes 1 to 4 until at least the seating is made, here up to time $t_1$, so that the motor 3 is driven at highest speed. From time $t_0$ to time $t_1$, the duty ratio is controlled within a range of 0 to 100% in any mode, depending on the pulling amount of the trigger 8, as shown with an arrow 65. On the other hand, at time $t_1$, the duty ratio is decreased to one of $D_1$ to $D_4$, depending on the set mode, as shown with arrows 61 to 64. Here, $D_4$ is about 60% and $D_1$ to $D_3$ are 15%, 30% and 45%, respectively. In the meantime, the control on the decrease degree of $D_4$ is arbitrary. The maximum (here, $D_4$) of the low duty ratio is preferably lowered from 100% by 10 percent or more. When $D_4$ is controlled to be 70% or lower, the high effect can be obtained. In FIG. 6B, in the mode 3, the duty ratio is controlled within a range of 0 to $D_3$, depending on the pulling amount of the trigger 8, as shown with an arrow 66. In this exemplary embodiment, when the motor is driven in the impact mode, the motor is controlled with full power up to time $t_1$, irrespective of whether any of the modes 1 to 4 is set, and the maximum duty value is changed depending on each mode value, after time $t_1$. Therefore, it is possible to quickly complete the fastening operation by using the higher-output, higher rotation motor, as compared to the related art.

In the meantime, a combination of the high duty ratio and the low duty ratio may be set in each mode, instead of the configuration where the high duty ratio is all set to be 100%. For example, the high duty ratio and the low duty ratio may be set in each mode so that a relation of the high duty ratio and the low duty ratio becomes 100% and 60% in the mode 4, is 90% and 45% in the mode 3, is 60% and 30% in the mode 2 and is 30% and 15% in the mode 1, for example. As a separate control method, when the pulling amount of the trigger is a predetermined value or larger, for example a half or larger in the zone from time $t_0$ to time $t_1$, the calculation unit 40 may fix the duty ratio to be 100% so that the motor is controlled at full speed.

Figure 7A:
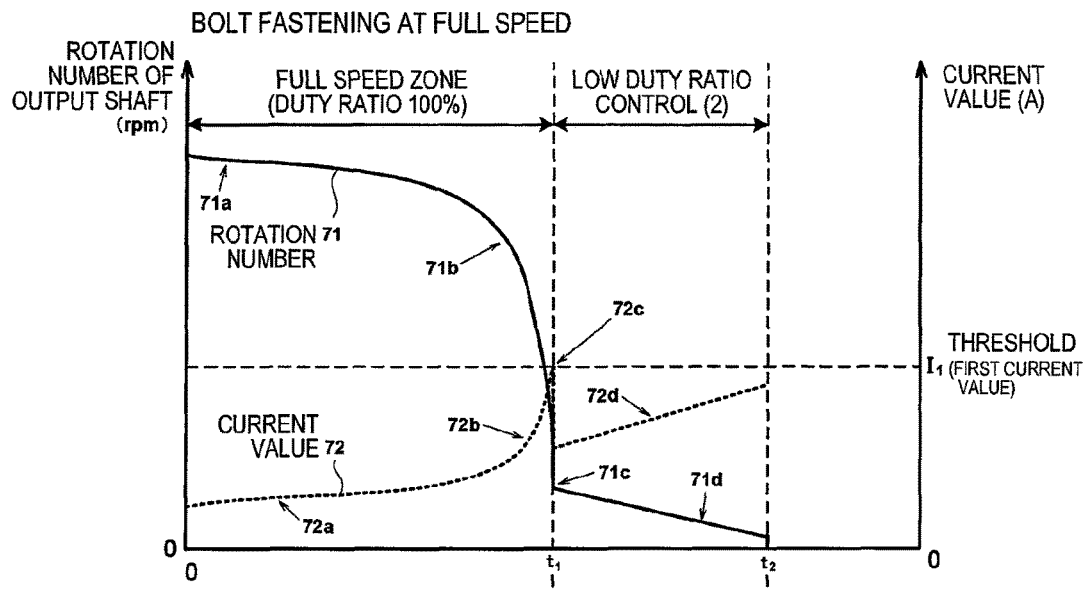
FIG. 7A is a graph showing a relation among a rotation number of an output shaft, a motor current value and a duty ratio of a PWM driving signal when performing a bolt fastening operation at full speed in the impact tool according to the exemplary embodiment of the invention
Figure 7B:
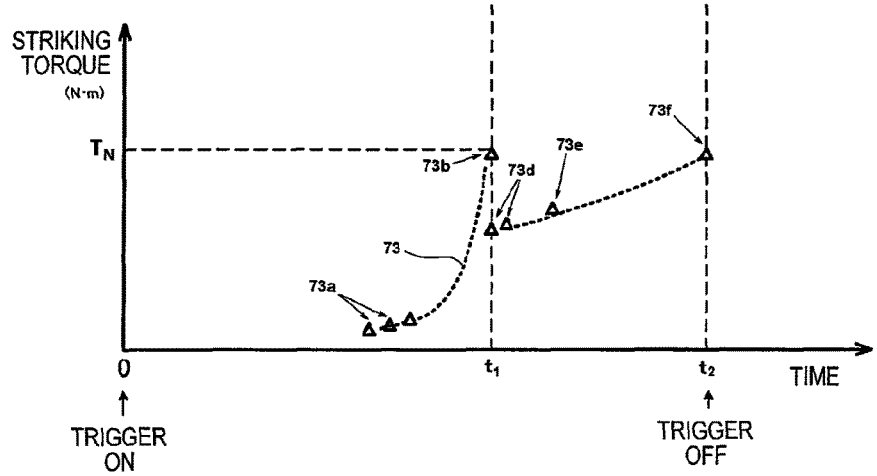
FIG. 7B shows a magnitude of striking torque at that time.

FIG. 7A is a graph showing a relation among a rotation number of the tip, a motor current value and a duty ratio of a PWM driving signal when performing a bolt fastening operation at full speed in the impact tool according to the exemplary embodiment of the invention. FIG. 7B shows a magnitude of striking torque at that time. As described in FIGS. 5 and 6, in this exemplary embodiment, from the seating until the predetermined striking is over, the motor 3 is rotated with the maximum rotation number of the duty ratio 100% to thus rotate the tip tool at high speed, irrespective of the operation modes. At time $t_1$ at which the predetermined striking torque is reached, the duty ratio is controlled to be decreased from 100% to the duty ratio corresponding to each set mode. When performing the control in this way, a rotation number 71 of the output shaft (=a rotation number of the tip tool) is changed from the substantially constant rotation number in a free run period shown with an arrow 71a to the sharp rotation reduction before and after the seating, as shown with an arrow 71b. The reduction of the rotation number 71 of the output shaft in this way is because the hammer 24 of the impact mechanism 21 retreats to thus start the striking operation. A current value 72 detected by the current detection circuit 41 (refer to FIG. 4) is substantially constant in the free run period near an arrow 72a and is gradually increased. However, the current value is rapidly increased near the seating of the bolt or screw due to the sharp increase of the reaction force (load) applied from the tip tool, as shown with an arrow 72b. At time indicated by an arrow 72c, when the current value exceeds a threshold $I_1$, the duty ratio is decreased from 100% to a predetermined value corresponding to the operation mode. After time $t_1$, the rotation number 71 is reduced from a value indicated by an arrow 71c to a value indicated by an arrow 71d due to the increase in the load. At time $t_2$, when the operator releases the trigger 8, the motor 3 stops. On the other hand, the current value flowing through the motor 3 is gradually increased, as indicated by an arrow 72d, but does not exceed the threshold $I_1$ because the duty ratio is drastically lowered. Therefore, it is possible to prevent the heat generation of the inverter circuit or motor 3, which is caused as the excessive current flows.

FIG. 7B shows a magnitude of striking torque 73 at the state shown in FIG. 7A. In FIGS. 7A and 7B, the horizontal time axes are matched. Some timing at which the striking is performed is indicated by triangular marks. Although only the representative triangular marks are shown, a plurality of striking is continuously performed from the first triangular mark (an arrow 73a) to the final triangular mark 73f. As can be understood from FIG. 7B, the striking operation by the impact mechanism 21 starts near the arrow 73a. In the impact tool 1 of this exemplary embodiment, about 10 to 30 striking are performed every second. At time of the arrow 73a at which the striking starts, the set duty ratio is 100%, and an increase rate of the current value 72 is increased while the plurality of striking is performed. When the current becomes threshold $I_1$ or larger, it is determined that the seating is completed and the duty ratio is thus decreased. Here, the threshold $I_1$ is set so that the striking, which is indicated by an arrow 73d and is performed at time $t_1$, becomes a fastening torque value TN corresponding to the set operation mode. The threshold $I_1$ is set for each operation mode, and an optimal value thereof is set by a test and the like upon product development and is preferably stored beforehand in the microcomputer and the like. After time $t_1$, the duty ratio is lowered. However, since the striking torque having a sufficient magnitude is generated, as shown by the arrows 73d, 73e, the screw or bolt can be securely fastened. The value of the duty ratio to be decreased is preferably set so that the striking torque value indicated by an arrow 73f at time t2 at which the operator releases the trigger 8 does not exceed the fastening torque value indicated by the arrow 73b. In the meantime, regarding the value of the duty ratio, which is decreased in each mode, an optimal value thereof is set by a test and the like upon product development and is preferably stored beforehand in the microcomputer and the like.

Figure 8:
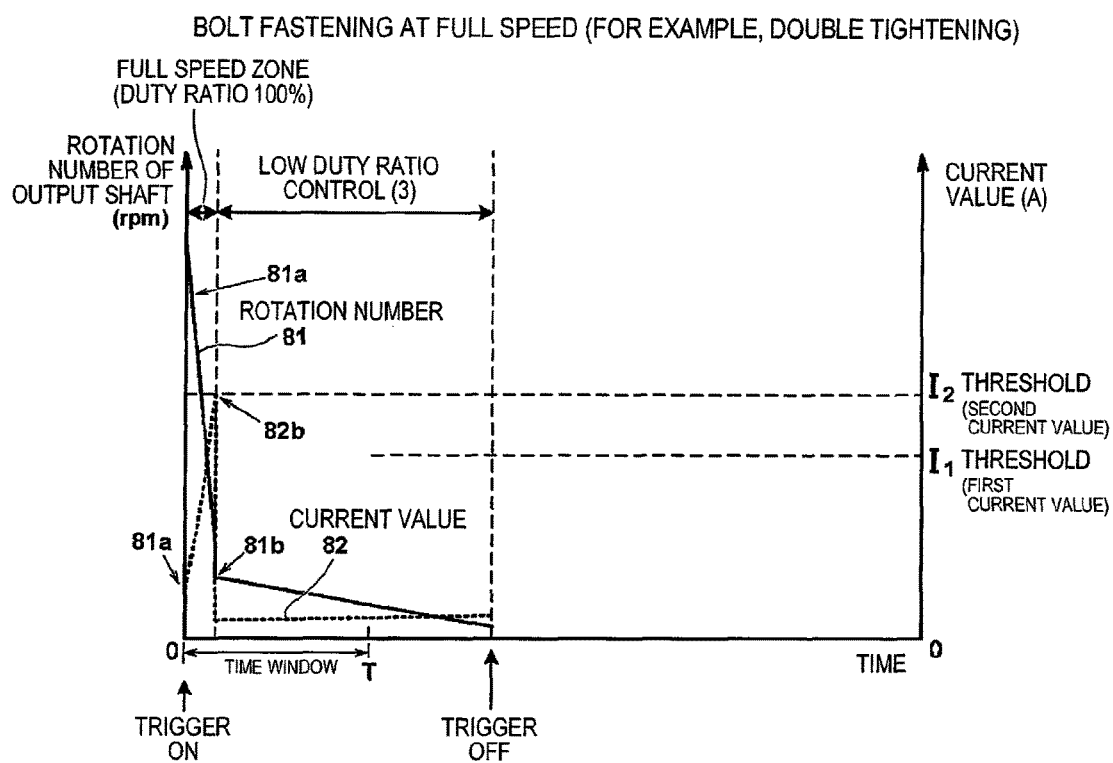
FIG. 8 is a graph showing a relation among the rotation number of the output shaft, the motor current value and the duty ratio of a PWM driving signal in the impact tool according to the exemplary embodiment of the invention (in the case of tightening a fixed bolt twice).

Next, a relation among the rotation number of the output shaft, the motor current and the duty ratio of the PWM driving signal when tightening the fixed bolt twice (double tightening operation) is described with reference to FIG. 8. As described in FIGS. 4 to 7, when the control is performed so that the motor 3 is driven at highest speed in the free run period, if the operator intends to tighten again the bolt or screw which has been already fastened for any reason, a head of the bolt or screw may be broken or the excessive force is applied to the motor or mechanism, which is not preferable. Therefore, in the impact tool 1 of this exemplary embodiment, a second current value $I_2$ larger than the first threshold $I_1$ is set and a state where the double tightening operation is performed is detected at an early stage. When the state is detected, the duty ratio is controlled to be immediately decreased. Here, a time window (here, from the trigger startup to time T) for setting a detection zone for detecting double tightening is set, and timing at which the duty ratio is decreased by a second threshold $I_2$ instead of the first threshold $I_1$ is determined in the time window. When the time T elapses, the timing at which the duty ratio is decreased by the first current value $I_1$ is switched. At time $t_0$, when the operator pulls the trigger, since the bolt, which is a fastening target, has been already fastened, the rotation number of the tip tool is rapidly reduced, as shown with an arrow 81a. Since the load is high, the current value 82 is sharply increased, as shown with an arrow 82a, and reaches the second threshold $I_2$ at time indicated by an arrow 82b. At that point in time, the duty ratio, which is 100% until then, is controlled to be changed to a lower duty value. While the operator releases the trigger 8, the motor 3 stops, according to the exemplary embodiment, since the current value 82 after lowering the duty is sufficiently smaller than the first threshold $I_1$, the current value does not exceed the first threshold $I_1$. In this way, the second threshold $I_2$ for double tightening detection is used for the predetermined time window after the trigger is pulled, and the method described in FIGS. 4 to 7 is adopted after the time window elapses. Therefore, upon the normal tightening of the screw or bolt, when the double tightening is tried for any reason, it is possible to effectively prevent the damage of the motor.

Figure 9:
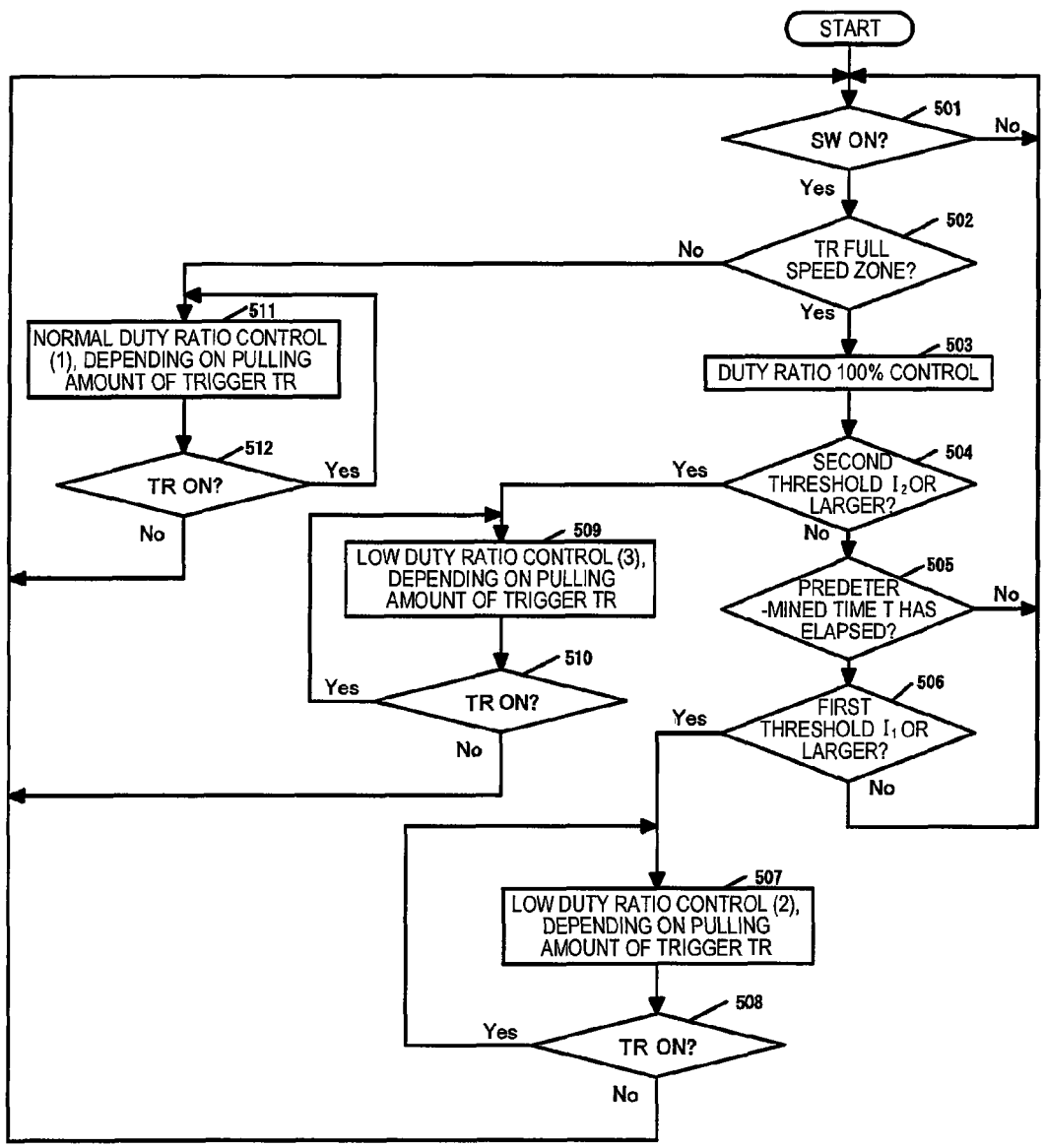
FIG. 9 is a flowchart showing a setting sequence of the duty ratio when performing a fastening operation using the impact tool 1 according to the exemplary embodiment of the invention.

In the below, a setting sequence of the duty ratio for motor control of the impact tool 1 according to an exemplary embodiment of the invention is described with reference to a flow chart of FIG. 9. The control sequence shown in FIG. 9 can be realized in a software manner by enabling the calculation unit 40 having a microprocessor to execute a computer program, for example. First, the calculation unit 40 detects whether the trigger (TR) 6 is pulled and turned on by an operator (step 501). When it is detected that the trigger is pulled, the calculation unit proceeds to step 502. Then, the calculation unit 40 determines whether a pulling amount of the trigger 8 is a maximum amount, i.e., the motor is within a full speed area (step 502). When it is determined in step 502 that the motor is not within the full speed area, for example, when the trigger 8 is pulled only by half, the calculation unit performs the normal duty ratio control, depending on the pulling amount of the trigger (step 511). For example, when the trigger is pulled by half, the pulling amount and the duty ratio value are preferably associated with each other proportionally or by a predetermined relation equation, for example, the duty ratio is decreased by half. Then, in step 512, the calculation unit determines whether the trigger 8 is kept at the on state. When it is determined that the trigger 8 is returned, the calculation unit returns to step 501, and otherwise, returns to step 511.

When it is determined in step 502 that the pulling amount of the trigger 8 is a maximum amount, i.e., the motor is within the full speed area, the calculation unit 40 sets the duty ratio to be 100% and drives the motor 3 (step 503). Then, the calculation unit 40 determines whether the current value detected by the current detection circuit 41 (refer to FIG. 4) is the second threshold $I_2$ or larger (step 504). Here, when the current value is the second threshold $I_2$ or larger, it means the double tightening described in FIG. 8. Therefore, the calculation unit changes the duty ratio from 100% to a low value to thus perform the duty ratio control (3), depending on the pulling amount of the trigger (step 509). In the meantime, the low duty ratio (3) is preferably set to be different for each mode, like the low duty ratio (2) shown in FIG. 6B. The duty ratio is preferably set so that the low duty ratio (2) and the low duty ratio (3) are not the same and are different, preferably the low duty ratio (3) is smaller than the low duty ratio (2). Then, in step 510, the calculation unit determines whether the trigger 8 is kept at the on state. When it is determined that the trigger 8 is returned, the calculation unit returns to step 501, and otherwise, returns to step 509.

When it is determined in step 504 that the current value detected by the current detection circuit 41 (refer to FIG. 4) is smaller than the second threshold $I_2$, the calculation unit determines whether the time window for setting the detection zone for detecting the double tightening, i.e., the predetermined time T has elapsed (step 505). When it is determined that the predetermined time T has not elapsed, the calculation unit returns to step 501. When it is determined in step 505 that the predetermined time T has elapsed, the calculation unit determines whether the current value is the first threshold $I_1$ or larger (step 506). When it is determined that the current value is smaller than the first threshold $I_1$, the calculation unit returns to step 501. Here, when the current value is the first threshold $I_1$ or larger, the calculation unit changes the duty ratio value from 100% to a low value, as described in FIG. 6B, thereby performing the low duty ratio control (2), depending on the pulling amount of the trigger (step 507). Then, in step 508, the calculation unit determines whether the trigger 8 is kept at the on state. When it is determined that the trigger 8 is returned, the calculation unit returns to step 501, and otherwise, returns to step 507.

As described above, according to the control of this exemplary embodiment, the motor is rotated at high speed (the duty ratio 100%) until the impact reaches release torque and the striking starts in the motor having the large non-load rotation number, and when it is determined that the plurality of striking is continuously made, the duty ratio is controlled to be decreased from the high duty ratio to the low duty ratio. Therefore, it is possible to implement the impact tool capable of preventing the excessive fastening and suppressing the temperature increase of the motor to thus quickly complete the fastening. If the sands are caught in the screw, the torque is instantaneously increased, so that the striking may be made only one time. At this time, if the control of decreasing the duty ratio is immediately performed in a situation where the current value just becomes a value or larger corresponding to the first striking, the duty ratio is immediately decreased after only one striking is made in the situation where the sands are caught in the screw, and the screw tightening thereafter is delayed. According to the invention, the duty ratio is decreased when it is determined that the screw tightening is continuously performed in a state where the torque is increased due to the plurality of striking. Therefore, it is possible to solve the problem of the tightening deficiency.

In this exemplary embodiment, the switching from the high duty ratio to the low duty ratio is made by the magnitude of the current value 72. However, the invention is not limited thereto. For example, a following method is possible. An increase rate per unit time of the current value 72 near the arrow 72b of FIG. 7A is monitored. When the increase rate is continuously kept at a high state for predetermined time, the duty ratio is switched from the high duty ratio to the low duty ratio. By this configuration, it is possible to check that the screw is continuously being tightened at the high torque state. The method of monitoring the increase rate of the current value 72 may be implemented by a well-known current increase rate monitoring method of calculating a differential value of current values that are detected every short time interval, for example.

A configuration is possible in which the electric tool uses a torque sensor for detecting a magnitude of the fastening torque value, a seated state of the fastening tool is correctly detected by the torque sensor and the duty ratio is decreased after confirming the seating. In this way, since the screw is continuously tightened at the high duty ratio until the seating is made, it is possible to fasten the screw from the free run state to the high torque at the moment of the seating. Thereafter, the duty ratio is lowered and the fastening is continuously performed, so that the fastening torque comes close to a predetermined value and a deviation of the fastening torque for each screw can be thus suppressed.

Second Exemplary Embodiment

Figure 10:
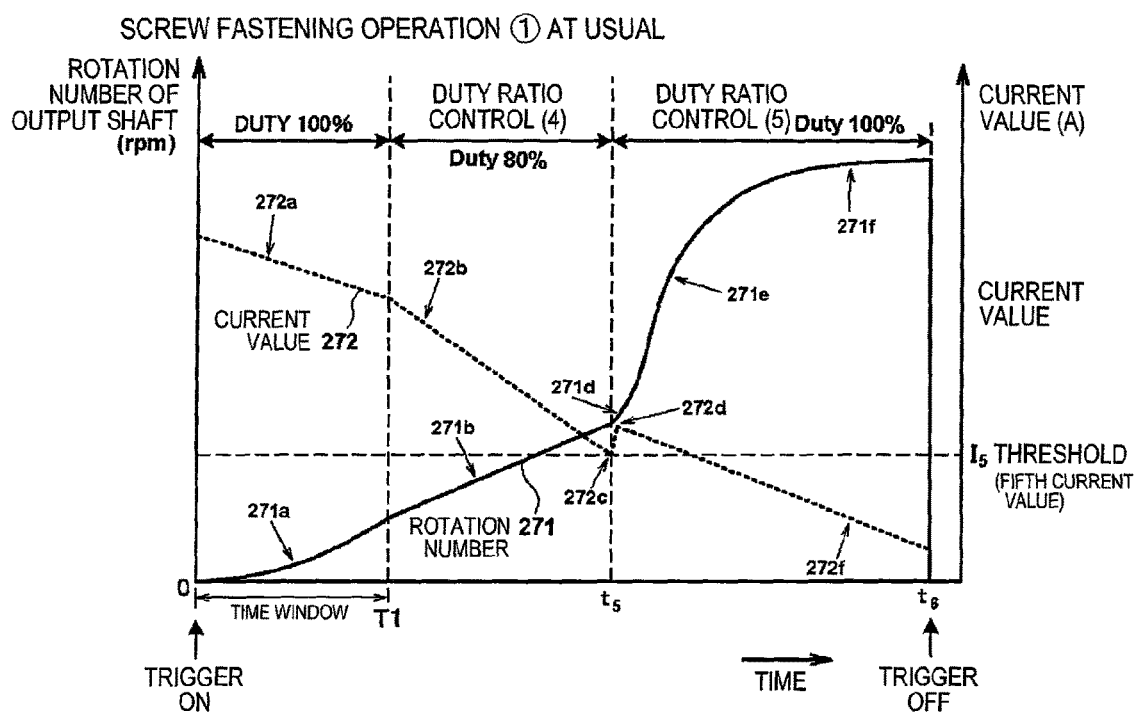
FIG. 10 is a graph showing a relation among the rotation number of the output shaft, the motor current value and the duty ratio of a PWM driving signal according to a second exemplary embodiment of the invention.
Figure 11:
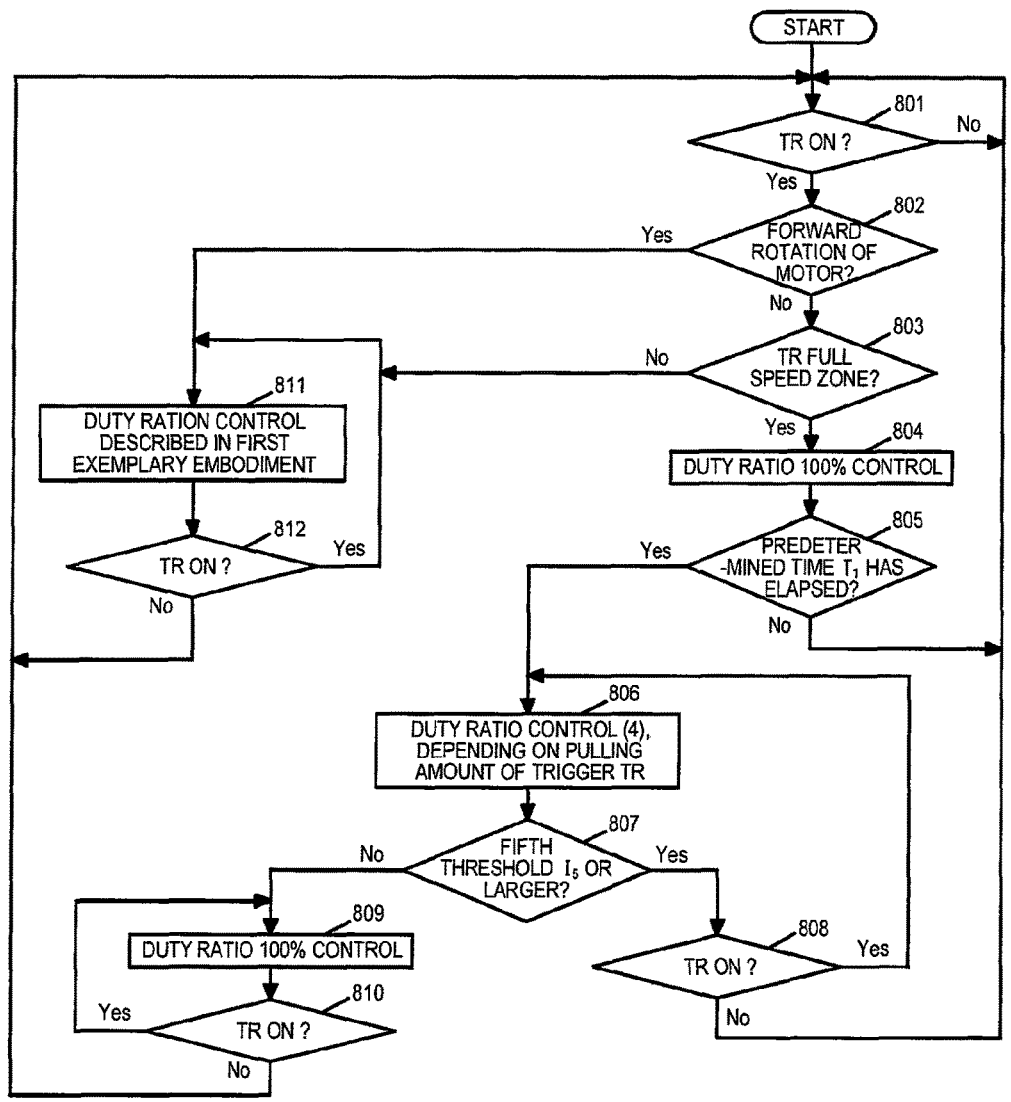
FIG. 11 is a flowchart showing a setting sequence of the duty ratio when fastening a wood screw using the impact tool 1 according to the second exemplary embodiment of the invention.

In the below, a second exemplary embodiment of the invention will be described with reference to FIGS. 10 and 11. FIG. 10 is a graph showing a relation among the rotation number of the output shaft (the rotation number of the tip tool), the motor current value and the duty ratio of a PWM driving signal in the impact tool according to the second exemplary embodiment, and shows a state where a fastened screw is unfastened by rotating the motor in the reverse direction. When unfastening the fastened screw or bolt, the motor is reversely rotated to rotate the tip tool in a reverse direction. When performing the unfastening operation, irrespective of the operation modes, it is important to sufficiently secure the torque upon the rotation startup. When the screw once starts to be unfastened, the torque that is necessary thereafter may be low. Upon the reverse rotation of the motor, the motor 3 is rotated with the maximum rotation number of the duty ratio 100% until the predetermined striking is over, thereby rotating the screw or bolt with the high torque. Here, the rotation number 271 of the anvil 30 is gradually increased, as shown with an arrow 271a. At an initial part of the zone indicated by the arrow 271a, the striking operation is performed, so that the rotation number of the motor 3 is not proportional to the rotation number of the anvil 30. When the screw or bolt once starts to rotate and predetermined time (time T1) elapses, the calculation unit 40 decreases the duty ratio of the PWM control from 100% to the duty ratio corresponding to the set mode. Here, the upper limit of the duty ratio is restricted from 100% to about 80%. The upper limit of 80% is a maximum setting value of the duty ratio when the trigger 8 is pulled to the highest degree. When the pulling amount of the trigger 8 is small, the duty ratio is set depending on a ratio of the pulling amount. The current value 272 that is detected by the current detection circuit 41 is largest just after the trigger 8 is turned on, i.e., upon the startup of the motor 3. When the rotation number of the anvil 30 is increased, as shown with the arrow 271a, the current value 272 is lowered, as shown with an arrow 272a. The motor is driven at the duty ratio of 100% after the trigger is pulled until it reaches the time T1. After the time T1, the motor 3 is driven with the duty ratio being restricted. The reason to restrict the upper limit of the duty ratio is as follows. Since the high-output, high-rotation motor 3 is used, as compared to the related art, if the motor is continuously rotated at the duty ratio of 100%, the thermal margin is reduced.

After the predetermined time window (time $t_0$ to T1) elapses, the duty ratio is restricted. Therefore, the current value 272 is reduced with a degree of the reduction being increased, as shown with an arrow 272b. At this time, the rotation number 271 is increased over time, as shown with an arrow 271b, because the reaction force applied from the screw is decreased as the screw is unfastened. At time $t_5$, when the current value 272 is lowered to a threshold (a fifth current value) $I_5$, the calculation unit 40 again returns the duty ratio to 100% and rotates the motor 3. At time t5, since the screw has been considerably unfastened, the reaction force applied from the tip tool is smaller, as compared to the initial state of unfastening the screw. When the duty ratio is returned to 100%, the current value 272 is increased for a moment, as shown with an arrow 272d and the rotation number of the anvil 30 is also sharply increased as shown with an arrow 271e and is substantially constant near the maximum rotation number, as shown with an arrow 271f. At time $t_6$, the operation of unfastening the screw is completed and the operator returns the trigger 8, so that the rotation of the motor 3 is completed. In the meantime, after time $t_5$, the duty ratio is controlled to be 100% but the reaction force applied from the tip tool is considerably low during the period. Therefore, even when the motor 3 is rotated at high speed, the maximum value of the current value 272 is slightly larger than the threshold $I_5$ and is a half or smaller than the current value 272 in the time interval T1, so that there is no worry about an amount of the heat generation and the motor 3 can be continuously driven. In the meantime, the threshold $I_5$ may be set to be different for each operation mode or to be constant, irrespective of the operation modes. However, an optimal value thereof is set by a test and the like upon product development and is preferably stored beforehand in the microcomputer and the like.

Next, a setting sequence of the duty ratio for motor control of the impact tool 1 according to the second exemplary embodiment of the invention is described with reference to a flow chart of FIG. 11. The calculation unit 40 detects whether the trigger (TR) 6 is pulled and turned on by an operator (step 801). When it is detected that the trigger is pulled, the calculation unit proceeds to step 802. Then, the calculation unit 40 determines whether the forward/reverse switching lever 10 is at a forward rotation side or a reverse rotation side by an output of the rotation direction setting circuit 44 (step 802). When it is determined in step 802 that the forward/reverse switching lever 10 is at the forward rotation side, the calculation unit performs the control of the duty ratio described in the first exemplary embodiment (step 811). Then, the calculation unit detects whether the trigger 8 is kept at the on state (step 812). When it is determined that the trigger 8 is returned, the calculation unit returns to step 801, and otherwise, returns to step 811.

When it is determined in step 802 that the forward/reverse switching lever 10 is at the reverse rotation side, i.e., that the motor 3 is rotated in the reverse direction, the calculation unit determines whether a pulling amount of the trigger 8 is a maximum amount, i.e., the motor is within a full speed area (step 803). When it is determined that the motor is within the full speed area, the calculation unit 40 sets the duty ratio to be 100% and drives the motor 3 (step 804). When it is determined that the motor is not within the full speed area, the calculation unit proceeds to step 811. Here, the full speed area may be a state where the trigger 8 is pulled to the highest degree. Alternatively, if the trigger 8 is pulled by a predetermined amount or larger, for example by 70% or larger, the calculation unit sets the duty ratio to be 100% and rotates the motor even when the pulling amount of the trigger is any amount within a range of 70 to 100%. Then, the calculation unit 40 determines whether predetermined time T has elapsed after the trigger 8 becomes on (step 805). When it is determined that the time T has elapsed, the calculation unit sets the upper limit of the duty ratio to be about 80% and performs the duty ratio control (4), depending on the pulling amount of the trigger (step 806). When it is determined that the time T has not elapsed, the calculation unit returns to step 801.

Then, the calculation unit 40 determines whether the current value detected by the current detection circuit 41 (refer to FIG. 4) is the fifth threshold $I_5$ or larger (step 807). Here, when the current value is the fifth threshold $I_5$ or larger, the screw is not sufficiently unfastened. Therefore, the calculation unit proceeds to step 808. When the trigger 8 is kept at the on state, the calculation unit returns to step 806, and when the trigger 8 is off, the calculation unit returns to step 801 (step 808). When it is determined in step 807 that the current value detected by the current detection circuit 41 (refer to FIG. 4) is smaller than the fifth threshold $I_5$, the calculation unit 40 sets the duty ratio to be 100% and drives the motor 3 (step 809). Regarding the duty ratio that is here set, the upper limit thereof that is set depending on the pulling amount of the trigger 8 may be 100%. Alternatively, when the trigger 8 is pulled by a predetermined amount (for example, 70%) or larger, the duty ratio may be fixed to 100%. Then, in step 810, when the trigger 8 is kept at the on state, the calculation unit returns to step 809 and when the trigger 8 is off, the calculation unit returns to step 801.

By the above control, the screw unfastening operation of reversely rotating the electric tool is performed. At this time, in this exemplary embodiment, the duty ratio upon the unfastening is set to be high. Therefore, it is possible to effectively prevent the problem that the screw or bolt is not unfastened due to the insufficient torque. In the zone where the reaction force applied from the screw or bolt is lowered at the latter half of the unfastening operation, the duty ratio or upper limit thereof is set to be 100% and the motor 3 is rotated at high speed. Therefore, it is possible to quickly complete the operation of unfastening the screw or bolt. In the meantime, although not described in FIGS. 10 and 11, the duty ratios are controlled in association with each other upon the forward rotation and upon the reverse rotation, so that it is possible to perform a higher level of control. For example, it may be possible to set a relation between the maximum duty ratio ($D_{max\ forward\ rotation}$) from time $t_0$ to time $t_1$ described in FIG. 6B and the maximum duty ratio ($D_{max\ reverse\ rotation}$) from time $t_0$ to time T1 in FIG. 10 so that $D_{max\ forward\ rotation} < D_{max\ reverse\ rotation}$. In this case, for example, it is possible to set $D_{max\ forward\ rotation}$ to be 95% and $D_{max\ reverse\ rotation}$ to be 100%. By the setting, the maximum rotary torque, which is generated in the anvil 30 upon the reverse rotation, is larger than the maximum rotary torque, which is generated in the anvil 30 upon the forward rotation. When the output torque of the electric tool is set in this way, it is possible to securely unfasten the fastened screw or bolt.

Figure 12:
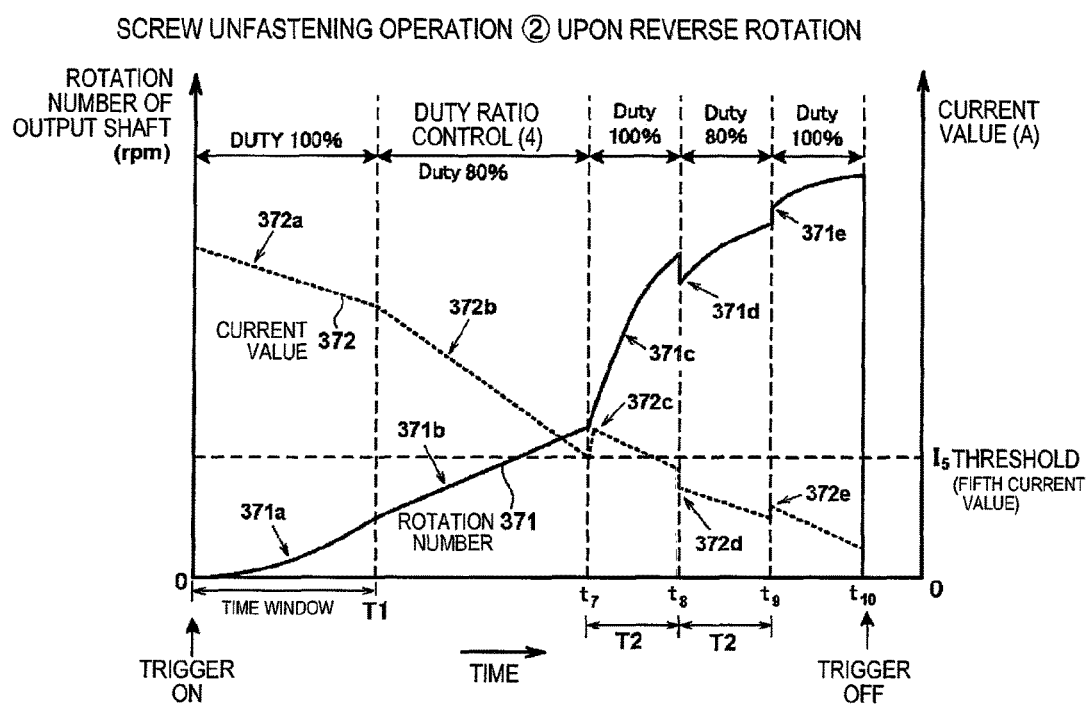
FIG. 12 is a graph showing a relation among the rotation number of the output shaft, the motor current value and the duty ratio of a PWM driving signal according to a modified embodiment of the second exemplary embodiment of the invention.

In the below, a modified embodiment of the second exemplary embodiment is described with reference to FIG. 12. In the second exemplary embodiment, when fastening the screw or bolt, the control is performed without fixing the upper limit of the duty ratio to 100% from the trigger ON to the trigger OFF. The reason is that the high-output, high-rotation motor 3 for which the continuous driving is not thermally and mechanically preferable is used, unlike the related art. In this exemplary embodiment, the control is performed while reducing the output of the high-output motor. In a modified embodiment shown in FIG. 12, the control is performed using the above idea. The control using the threshold $I_5$ from the trigger ON until the current is below the threshold $I_5$ is the same as the control described in FIG. 10. Just after the trigger 8 is pulled, the motor 3 is rotated with the maximum rotation number of the duty ratio 100% until the predetermined time window (time $t_0$ to T1), thereby rotating the screw or bolt with the high torque. Here, the rotation number of the anvil 30 is gradually increased, as shown with an arrow 371a, and a current value 372 is gradually decreased, as shown with an arrow 372a.

When the predetermined time (time T1) elapses, the duty ratio control (4) of limiting the duty ratio of the PWM control from 100% to the duty ratio corresponding to the set mode, for example 80% is performed. When the duty ratio is restricted, the current value 372 is rapidly reduced with a degree of the reduction being increased, as shown with an arrow 372b, and the rotation number 371 is increased over time, as shown with an arrow 371b. At time $t_7$, when the current value 372 is reduced to the threshold (the fifth current value) $I_5$, the calculation unit again returns the duty ratio to 100%. When the duty ratio is returned to 100%, the current value 372 is increased for a moment, as shown with an arrow 372c, and the rotation number of the anvil 30 is also sharply increased, as shown with an arrow 371c. Here, in this modified embodiment, after the predetermined time T1 elapses, the calculation unit 40 alternately switches the motor control by the low duty ratio and the motor control by the high duty ratio and performs the control so that the switching continues until the operator turns off the trigger 8. It may be possible to diversely set the timing at which the low duty ratio and the high duty ratio are alternately switched. In this exemplary embodiment, the switching is performed every predetermined time interval. In the example of FIG. 12, after time $t_7$, the upper limit of the duty ratio is switched between a high value (here, 100% between time $t_7$ and time $t_8$) and a low value (here, 80% between time $t_8$ and time $t_9$) every predetermined time interval (time T2). In this exemplary embodiment, the time T1 may be set to 0.2 second and the time T2 may be set to about 0.1 second. However, the times may be appropriately set in conformity to the screw or bolt to be unfastened. The high duty ratio and the low duty ratio are not limited to 100% and 80%, respectively. For example, a ratio of the low duty ratio and the high duty ratio may be the other ratios and the low duty ratio may be set within a range of 80% to 30% of the high duty ratio. In the meantime, when the duty ratio is switched every predetermined time interval, the rotation number 372 of the anvil 30 is increased as shown with the arrow 371*c*, is decreased at time $t_8$, as shown with an arrow 371*d* and is then again increased. Then, the rotation number 372 is increased at time $t_9$, as shown with an arrow 371*e* and is then gradually increased. Here, the rotation number 372 is sharply varied at times $t_7$, $t_8$, $t_9$ by switching the duty ratio. The current value 372 is also varied at times $t_7$, $t_8$, $t_9$, as shown with arrows 372*c*, 372*d*, 372*e*. At this time, when the variation is large, the operator may feel uncomfortable. Therefore, it is preferably set the duty ratio so that it is not sharply varied as much as possible. Alternatively, it may be possible to gradually change the duty ratio at times $t_7$, $t_8$, $t_9$, not to stepwise change the duty ratio, or to perform the continuous variable control.

According to the second exemplary embodiment, even when the motor 3 is reversely rotated, the motor 3 is controlled so that it is not continuously driven at the duty ratio of 100% for the predetermined time or longer. Thereby, it is possible to implement the electric tool capable of suppressing the heat generation of the motor 3 and adopting the high-power motor, which has the higher output or rotation number than the motor of the related art. In the meantime, the duty ratio control upon the reverse rotation is not limited to the impact tool having the deceleration mechanism 20 serving as the power transmission mechanism and the impact mechanism 21 and can be also applied to the control upon reverse rotation in a driver drill and to the control of the other rotating tools performing the forward or reverse rotation. Like this, even upon the reverse rotation, the motor is enabled to rotate with the rotation number corresponding to or larger than the rotation number upon the forward rotation, so that it is possible to securely unfasten the fastened screw or bolt.

In the meantime, in the second exemplary embodiment, when the predetermined time (time T1) elapses, the duty ratio of the PWM control is lowered from 100% to the duty ratio corresponding to each set mode. However, the lowering switching may be performed by other conditions. For example, when the current exceeds a predetermined value, the duty ratio may be lowered. Alternatively, when the rotation number of the motor is below a predetermined value, the duty ratio may be lowered. As a modified embodiment of the second exemplary embodiment, instead of the configuration where the control is performed at the high duty ratio at the initial stage after the reverse rotation starts and then is performed at the low duty ratio, a configuration is also possible in which an advance of the motor is made to be small, an energization angle of the motor is switched or the coil of the motor is switched to switch the rotating property of the motor so that the maximum rotation number, which can be controlled by the motor upon the reverse rotation, is increased and is then decreased, thereby efficiently performing the screw or bolt unfastening operation by the reverse rotation. In this control of switching the rotating property of the motor from the high-speed mode to the low-speed mode, the switching is preferably performed after the predetermined time T1 elapses from the pulling of the trigger. Furthermore, a configuration is also possible in which when the current value detected by a current detector is below the threshold $I_5$, the controller switches the rotation number from the low rotation number (the low-speed mode) to the high rotation number (the high-speed mode).

Hereinabove, although the invention has been described with reference to the exemplary embodiments, the invention is not limited to the above-described exemplary embodiments but can be variously modified without departing from the gist of the invention. For example, although the impact tool to be driven by the battery has been described in the above-described exemplary embodiments, the invention is not limited to the cordless impact tool but can be similarly applied to an impact tool using a commercial power supply. Further, the control of changing the relation between the pulling amount of the trigger and the set duty ratio, which is performed after the trigger is pulled until the pulling is over, can be also applied to an electric tool driving the brushless motor by the PWM control, for example a driver drill, an impact driver of a so-called electronic pulse type, and the like.

This application is based upon and claims the benefit of priority of Japanese Patent Application No. 2013-093878 filed on Apr. 26, 2013, the contents of which are incorporated herein by reference in its entirety.

The invention claimed is:

1. An electric tool comprising:
   a motor configured to be driven by PWM controlling a semiconductor switching element;
   a trigger configured to adjust startup and rotation of the motor;
   a changeover switch configured to switch a rotation direction of the motor between a forward rotation and a reverse rotation;
   a power transmission mechanism configured to rotate a tip tool by the motor; and
   a controller configured to control rotation of the motor,
   wherein in a state where the reverse rotation is set by the changeover switch,
   the controller controls a duty ratio of the PWM control of the semiconductor switching element according to an operating amount of the trigger to drive the motor in a case that the operating amount of the trigger is less than a predetermined amount, and
   the controller controls the semiconductor switching element at a high duty ratio to drive the motor in a case that the operating amount of the trigger is the predetermined amount or larger, and thereafter the controller restricts the duty ratio of the PWM control of the semiconductor switching element when the controller detects a predetermined state.

2. The electric tool according to claim 1, wherein in a case that the operating amount is a maximum amount, the controller restricts the duty ratio after predetermined time elapses from the pulling of the trigger or a predetermined striking is over.

3. The electric tool according to claim 1, further comprising a current detector configured to detect a current value flowing through the motor or the semiconductor switching element,
- wherein when a current value detected by the current detector is below a threshold, the controller switches from a low duty ratio to the high duty ratio.

4. The electric tool according to claim 3, wherein the high duty ratio is 100% and the low duty ratio is 80% or lower.

5. The electric tool according to claim 3, wherein the controller alternately switches the motor control by the low duty ratio and the motor control by the high duty ratio.

6. The electric tool according to claim 5, wherein the controller alternately switches the low duty ratio and the high duty ratio every predetermined time interval.

7. An electric tool comprising:
- a motor configured to be driven by PWM controlling a semiconductor switching element;
- a trigger configured to adjust startup and rotation of the motor;
- a power transmission mechanism configured to rotate a tip tool by the motor;
- a controller configured to control rotation of the motor; and
- a current detector configured to detect a current value flowing through the motor or the semiconductor switching element,
- wherein the controller controls the semiconductor switching element at a first duty ratio to drive the motor after the trigger is pulled, thereafter the controller changes from the first duty ratio to a second duty ratio, which is lower than the first duty ratio, to drive the motor in a case that the current value detected by the current detector exceeds a first threshold, and thereafter the controller changes from the second duty ratio to a third duty ratio, which is lower than the second duty ratio, to drive the motor in a case that the current value exceeds a second threshold which is larger than the first threshold.

8. The electric tool according to claim 7,
- wherein when the current value detected by the current detector is below a third threshold which is lower than the first threshold, the controller switches a duty ration of the PWM control of the semiconductor switching element from the third duty ratio to the first duty ratio.

9. The electric tool according to claim 1, wherein in a state where the forward rotation is set by the changeover switch, the controller controls the semiconductor switching element according to an operating amount of the trigger to drive the motor.

10. The electric tool according to claim 7, further comprising a changeover switch configured to switch a rotation direction of the motor between a forward rotation and a reverse rotation,
- wherein the first duty ratio defined in a case that the reverse rotation is set by the changeover switch is higher than the first duty ratio defined in a case that the forward rotation is set by the changeover switch.

11. The electric tool according to claim 1, wherein the controller lowers the duty ratio of the PWM control of the semiconductor switching element when the controller detects the predetermined state.

* * * * *